United States Patent [19]

Tuy et al.

[11] Patent Number: 4,882,679

[45] Date of Patent: Nov. 21, 1989

[54] SYSTEM TO REFORMAT IMAGES FOR THREE-DIMENSIONAL DISPLAY

[75] Inventors: Heang K. Tuy, Cleveland; Todd J. Krochta, Akron; Frederick C. Mailey, South Euclid; Hsayjern Lin, Richmond Heights, all of Ohio

[73] Assignee: Picker International, Inc., Highland Hts., Ohio

[21] Appl. No.: 126,368

[22] Filed: Nov. 27, 1987

[51] Int. Cl.$^4$ .............................................. G09G 1/06
[52] U.S. Cl. .............................. 364/413.22; 340/727; 340/729
[58] Field of Search ....................... 364/413.13, 413.16, 364/413.18, 413.19, 413.22; 340/724, 727, 729

[56] References Cited

U.S. PATENT DOCUMENTS

| | | | |
|---|---|---|---|
| 4,075,700 | 2/1978 | Blay | 364/413.22 |
| 4,245,244 | 1/1981 | Lijewski et al. | 358/183 X |
| 4,520,316 | 5/1985 | Hall et al. | 324/309 |
| 4,590,558 | 5/1986 | Glover et al. | 364/413.19 |
| 4,608,635 | 8/1986 | Osterholm | 364/414 |
| 4,674,046 | 6/1987 | Ozeki et al. | 364/414 |
| 4,710,715 | 12/1987 | Mee et al. | 324/307 |
| 4,710,876 | 12/1987 | Cline et al. | 364/414 |
| 4,729,098 | 3/1988 | Cline et al. | 364/414 |
| 4,751,643 | 6/1988 | Lorensen et al. | 364/413.13 |

OTHER PUBLICATIONS

"Direct, 2-D Display of 3-D Objects", by Tuy et al., IEEE, CG&A, Oct. 1984, pp. 29-33.
"The Theory, Design, Implementation and Evaluation of a Three Dimensional Surface Detection Algorithm" by Artzy et al., Computer Graphics & Image Processing, 15, 1981, pp. 1-24.
"Geometric Modeling Using Octree Encoding" by D. Meagher, Computer Graphics and Image Processing, (1982), pp. 129-147.
"Interactive Segmentation and Boundary Surface Formation for 3-D Digital Images" by J. Udupa, Computer Graphics and Image Processing, (1982), pp. 213-235.
"Display of 3D Information in Discrete 3D Scenes Produced by Computerized Tomography" by J. Udupa, Proceedings of the IEEE, vol. 1, No. 3, Mar. 1983, pp. 420-431.

*Primary Examiner*—Jerry Smith
*Assistant Examiner*—Steven G. Kibby
*Attorney, Agent, or Firm*—Fay, Sharpe, Beall, Fagan, Minnich & McKee

[57] ABSTRACT

A system for three-dimensional diagnostic imaging generates a plurality of slice images of a specimen. A region of interest is selected from within a slice and is extrapolated to subsequent slices. A boundary of indicative of a surface of interest is selected from within the region of interest to facilitate generation of an image representation of a three-dimensional surface of interest to be assembled from subsequent slices of the plurality. A viewing surface is defined in relation to a generated surface image which was selected from the boundary. A scaling means assigns a scaled gray level to the three-dimensional image to facilitate three-dimensional viewing of the object when it is projected on the viewing surface. Image information is selectably modified by data from the original slice images to add surface density visualization. Means is also provided to facilitate selective segmentation of a three-dimensional image along a plane or planes of interest. An interactive procedure is provided to facilitate cutting of a three-dimensional object from its perspective view (with or without density information).

48 Claims, 10 Drawing Sheets

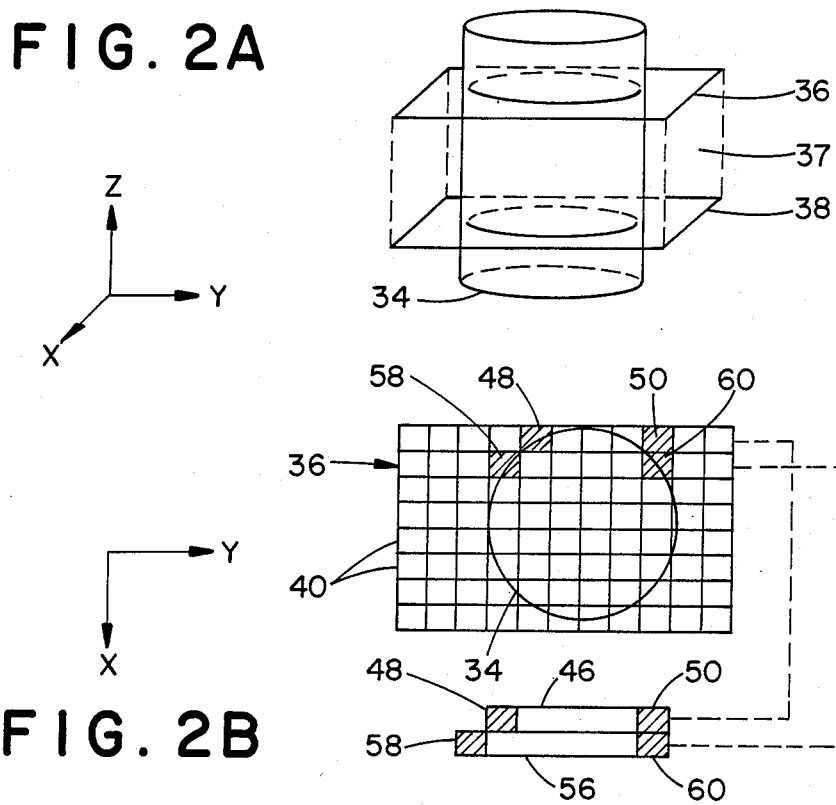
FIG. 2A
FIG. 2B
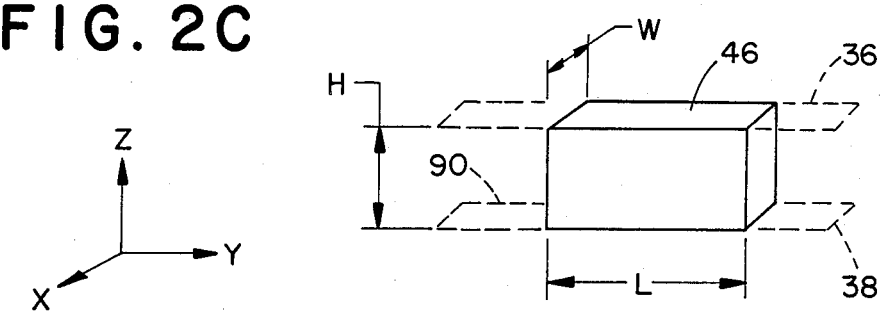
FIG. 2C 4,882,679

SYSTEM TO REFORMAT IMAGES FOR THREE-DIMENSIONAL DISPLAY

BACKGROUND OF THE INVENTION

This application pertains to the art of diagnostic imaging and more particularly to three-dimensional imaging.

The invention is particularly applicable to CT scanners and will be described with particular reference thereto although it will be appreciated that the invention has broader application such as generating three-dimensional diagnostic images from data acquired by magnetic resonance imaging.

With the advent of computed tomography ("CT") and magnetic resonance imaging ("MRI"), cross-sectional images of the human anatomy may be generated. Data obtained by the CT or MRI scanners is assembled and a gray scale is assigned in accordance with data obtained from a particular section of the data.

As organs are, however, three-dimensional in reality, a series of slices or scans must be taken, and a mental integration is required to visualize the actual anatomy. A need was presented to place such a series of reconstructed planar images in a more familiar format. This type of image reformation aids physicians in their mental integration. It also aids in filling the communication gap between radiologists, referring physicians, collaborators, and their patients. Better planning in medical treatments or surgical operations is resultant from this type of imaging.

In the last decade, there have been many suggested methods to reformat cross-sectional images and present them as a three-dimensional image from any perspective view. Essentially, five different approaches have been tried. These include the cuberille approach, the octree approach, the ray tracing approach, the triangulation approach, and the contour approach. Each of these approaches, however, suffers from its own distinct disadvantageous.

In order for a three-dimensional imaging processor to become practically useful, a system response must be extremely fast, ideally less than one second per frame if not real time. In the prior art systems, implementation at such speeds could only be achieved with use of special purpose hardware Such special purpose hardware is extremely expensive, and is generally not cost effective. Such dedicated hardware is not usable for other process operations except for its particular three-dimensional reformatting.

Another disadvantage of the prior art lies particularly with the cuberille-type approach. In such systems, preprocessing of original image data is required as the underlying model of this approach assumes that the three-dimensional object is composed of cubes of the same size. Since, in fact, input data from a CT or MRI scanner is typically not cubic as the distance between two consecutive slices is commonly much larger than the slice of pixels or reconstructed images, resolution and accuracy is forfeited.

The present invention contemplates a new and improved method and apparatus which overcomes all of the above referred problems and others, and provides a system for generating three-dimensional diagnostic images which is simple, economical, and readily adaptable to general purpose processor means.

SUMMARY OF THE INVENTION

In accordance with the present invention, a diagnostic imaging system for forming a three-dimensional representation of the specimen comprises a means for acquiring slice data indicative of a physical property of a plurality of generally planar regions of a specimen. Each generally planar region is divided into a plurality of subregions which are represented by data representative of that portion of the slice data unique thereto. A means is provided for assigning a viewing value to generally all of the subregions of at least one of the plurality of generally planar slices. The viewing value is assigned in accordance with the physical property of that particular subregion. A means is provided for apportioning a planar region to form a region of interest which encompasses a selected surface boundary. Means is provided for selecting the surface boundary of interest from within the region of interest, and for assembling image data representative of the boundary of interest from a plurality of the slices. A scaled viewing value is assigned to data of a surface of interest, the scaled value being determined by anticipated projection onto a viewing surface.

In accordance with another aspect of the present invention, scaled viewing value is determined in accordance with displacement of a portion of the surface of interest from the viewing surface.

In accordance with another aspect of the present invention, a system is provided for selecting a region of interest from data generated from a single slice, and means for extrapolating that region of interest to subsequent slices.

In accordance with a still more limited aspect of the present invention, the boundary of interest is selected from a single slice, and extrapolated into the region of interest of subsequent slices.

In accordance with another aspect of the present invention, a position of the viewing surface in relation to the image is variable.

In accordance with a different aspect of the present invention, a system is provided to implement surface density imaging on a three-dimensional image.

In accordance with yet a different aspect of the present invention, a system is provided for slicing an image along a selected planar region to view a cross-section of a three-dimensional imaged object.

An advantage of the present invention is that a system is provided wherein a three-dimensional image is generated from a series of slice scans obtained from conventional imagers.

Another advantage of the present invention is the provision of a system for generating three-dimensional images with increased fidelity and resolution.

Another advantage of the present invention is the provision of a system for generating three-dimensional images which does not require specialized hardware.

Another advantage of the present invention is the provision of a system with which surface density of three-dimensional image may be visualized.

Still another advantage of the present invention is the provision of a system with which cross-sectional cuttings of a three-dimensional image may be selected and viewed.

Further advantages will become apparent to one of ordinary skill in the art upon a reading and understanding of the following specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 2 is a diagram illustrating three-dimensional image generated in accordance with the present invention;

DETAILED DESCRIPTION OF THE PREFERRED EMBODIMENTS

Figure 1:
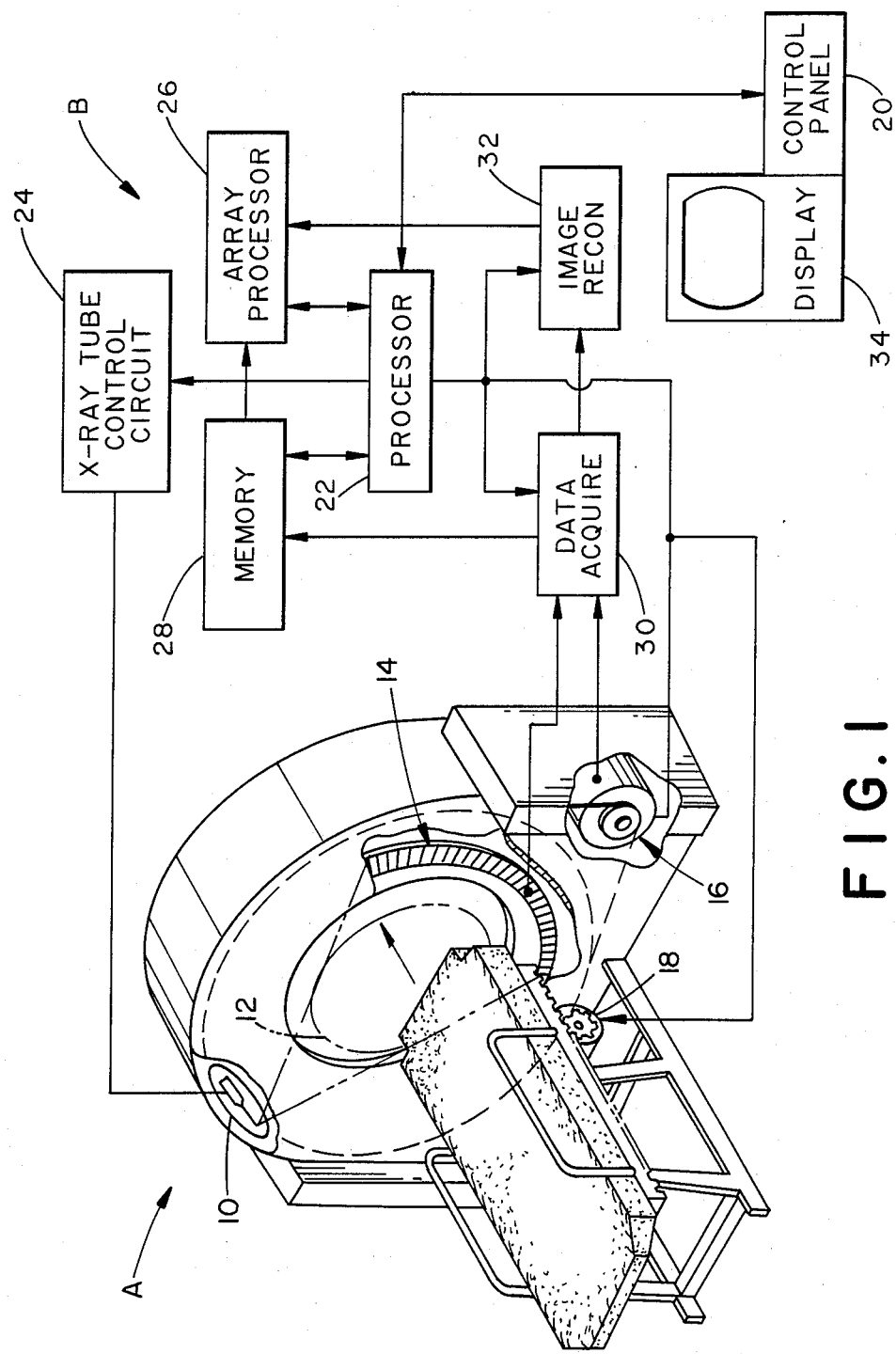
FIG. 1 is a block diagram of a three-dimensional image generating apparatus of the present invention and a system for representation thereof.

Referring now to the drawings wherein the showing are for the purposes of illustrating the preferred embodiments of the invention only and not for the purposes of limiting the same, FIG. 1 illustrates a block diagram of a diagnostic imaging apparatus performing a three-dimensional representation of a specimen. An acquisition means for acquiring slice data A is interfaced with a data processor/control circuit B. As illustrated, the acquisition means A is comprised of a CT scanner and will be described with particular reference thereto. It will be appreciated, however, that similar sliced data may readily be acquired by any other suitable slice image apparatus such as an MRI device.

The CT scanner is comprised of an x-ray source 10 which projects a fan beam of x-rays through an image circle 12 to a detector array 14. The x-ray source 10 is variable in relation to the image circle 12 to provide relative motion therebetween under the control of motor means 16. A plurality of generally parallel slices is obtainable by incrementing a subject through the image circle 12 between subsequent scans by such means as the gearing 18. A processor 22 interfaces an x-ray tube control circuit 24 which facilitates acceleration/deceleration control of a rotating anode of x-ray tube 10, as well as controlling generation the x-ray fan beam. An array processor 26 works under control of a program stored in memory means 28. The array processor functions in conjunction with the processor 22, and under programming noted below. Use of an array processor is advantageous for rapid processing of the three-dimensional image data of the present system.

Slice data is acquired from the acquisition means A via data acquire circuitry 30. Images generated from the array processor 22 are reconstructed by the image reconstruction circuitry 32. A control panel 20 allows for human interaction with the processor 22. Finally, a display means 34 allows for viewing of a resultant image.

In the preferred embodiment, the array processor 26 is comprised of three processor elements for facilitating rapid computation. It will be appreciated, however, that other processing units will function adequately when images are processed in accordance with the teachings of the present system.

The processor takes a set of images of consecutive slices of a three-dimensional object generated by the acquisition means A and produces spatially encoded slice data indicative of a physical property thereof. Means is provided for assigning a viewing value to generally all subregions of at least one of the generally planar slices. This viewing value is suitably a gray scale level. These images of consecutive slices are given in a format similar to that of a conventional CT or MRI scanner.

The subject procedure for generating the three-dimensional images renders such a generation to be particularly adaptable to conventional processors such as the subject array processor. Three-dimensional objects under investigation, such as bones or organs, usually extend through many consecutive cross-sectional image slices. For instance, a set of cross-sectional CT images would be required for investigation of a lumbar spine since the spine extends beyond one slice's thickness. To efficiently extract the three-dimensional object from the slice, a three-dimensional box which is large enough to encapsulate the three-dimensional object under investigation is initially selected. This three-dimensional box, called the box of interest ("BOI") which is smaller than a toll volume represented by a slice set, reduces total information necessary to process and, therefore, reduces the processing time. The BOI functions to apportion each image slice into a two-dimensional region thereof. Each region, referred to as a region of interest ("ROI") is in turn comprised of a plurality of subregions which are represented by data obtained from the data acquisition means. The ROI is preferably selected from a single slice image, and projected or extrapolated onto subsequent slices for practicality. It will be appreciated, however, that in certain situations it may be desirable to select an ROI from two or more regions to encompass a certain volume. For example, a first ROI might be selected having a first set of dimensions, and a second ROI selected having a second set of dimensions which are greater or less than the first, with intermediate slices therebetween being functionally related to the dimensions of the two dimension sets. For most purposes, however, a single ROI with a given set of dimensions extrapolated or projected onto subsequent slices is adequate.

After a region of interest has been defined, an object or boundary of interest of a subject is selected from therewithin. Again, such object is suitably selected from a single ROI from a single slice and projected onto subsequent ROI's of the box of interest. In certain situations, however, it is appreciated that the boundary of interest may desirably be selected from two or more of the regions of interest.

Selection of the boundary of interest may be made by manual selection from a display, such as by placing a cursor on that boundary, or by isolating a particular boundary with a given gray scale level. In the preferred embodiment, a combination of both is implemented. The region of interest is initially generated as a planar image. A selected range of gray scales is assigned to this region of interest and only those areas falling within this range are then illuminated. An operator or technician then selects, through the control panel 20 (FIG. 1) which of the surfaces or boundaries within this range are to be taken. This is in turn projected onto subsequent regions of the box of interest.

Turning to FIG. 2, a sample object is illustrated in a box of interest 37 which has in turn been assembled from consecutive slices. The object or specimen 34 is sectioned in its entirety by two slices. Regions of interest 36, 38 are selected from each slice. Each region of interest 36, 38 is itself comprised of subregion data 40 which may be referred to as a picture element or pixel. The pixel is so named due to its use to generate a subsequent image by assigning a unique viewing value or gray scale level thereto which is a function of the physical property of that particular element as gleaned from the slice imaging apparatus.

When the pixels 40 of each region of interest 36, 38 are so placed, a volume element ("VOXEL") which is indicative of a volume property of the subject specimen is definable.

In general, an object under investigation must undergo further processing from the three-dimensional box which encapsulates it. In the present system, this processing is referenced to as segmentation. Segmentation consists of multiple computer graphics and image processing techniques used in unison. These techniques include thresholding, contouring, and region growing. The segmentation process allows for the image processing to be completed on a standard processor. In segmentation, once the object of interest is extracted from the three-dimensional box in the fashion illustrated above, the object is represented in a concise fashion. In the present system, the scan line representation technique is implemented. In this technique, an object is represented by a set of segments which fill the object volume completely. Each segment is, in turn, represented by its two end points, the slice number in which the segment belongs, and the row number of the segment within the slice. Turning particularly to FIG. 2(b), it will be seen that creation of two such segments has been illustrated. The segment 46 is created from the endpoints (pixels) 48, 50, while the segment 56 is created from the endpoints 58, 60.

Figure 3:
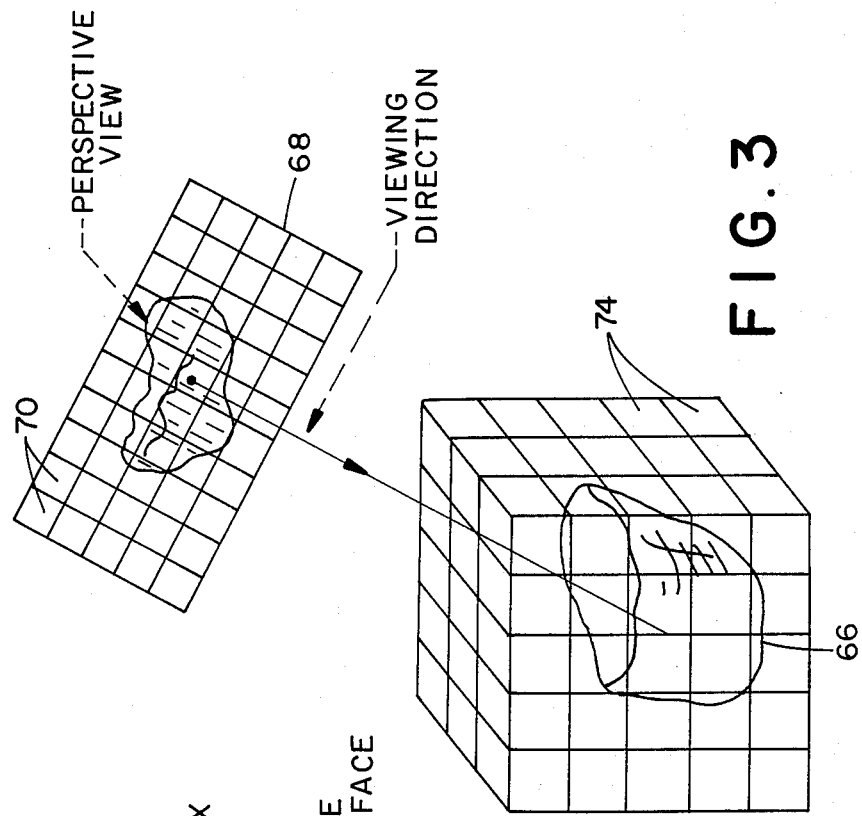
FIG. 3 illustrates a segmented object and a projection thereof onto a viewing surface.

With reference to FIG. 3, the presently described three-dimensional reformatting process is capable of generating perspective three-dimensional images of an object 66 in any given viewing direction. Each viewing direction is associated with a rectangle or a square viewing surface such as 68 on which corresponding perspective three-dimensional images are formed. This rectangle or viewing area is referred to as a screen for the reason that the generated three-dimensional image is viewed by displacing it on a two-dimensional viewing area. Such as that continued in display console 34 (FIG. 1).

A perspective three-dimensional view of a three-dimensional object may be viewed as being comprised of orthogonal projections to the screen of points on the surface of the object onto that screen. To provide a depth queue effect in the viewing of the generated image, the projected points on the screen are assigned, via a scaling means, with a viewing value such as a number representing a shade of gray, called a gray level. This assigned gray level is inversely proportional to a shortest distance from a corresponding point on the surface of the object along a normal to the screen. The viewing directions is assumed to be normal to the screen. In this framework, if two points on a surface of the object project onto the same point of the screen, only a point closest to the screen is visible. Moreover, points on the surface of the object which are closer to the screen are seen painted whiter, and points on the surface which are further away from the screen are darkened to facilitate a pseudo three-dimensional picture.

To render the curvature of the surface of the object at a visible point, the scaling means may alternatively or additionally include means to assign a corresponding gray level multiplied with a weight which is a function of a cosine of an angle of the normal to the screen and the normal to the surface of the object that a particular point in consideration. For an efficient implementation in terms of computational time and computer memory, this angle is estimated from the distance of the surrounding points in the screen to corresponding visible points on the surface of the object. More precisely, the formula used to assign a gray level appears below:

$$g = SCALE * \cos^m Maximum(AVERD, CUTOFF) * (K * (d-DMAX) + GMIN) \quad \text{FORMULA (1)}$$

where: g = assigned gray level
d = assigned distance to viewing area
$K = (GMAX - GMIN)/(DMIN - DMAX)$
$DMIN = 0.5 * DIAG$
$DMAG = 1.5 * DIAG$
DIAG = the diagonal of the Box Of Interest
AVERD = sum of four numbers, each number being the minimum between MAXA and the absolute value of the difference between the distances assigned to one of the four opposite pairs of pixels surrounding the pixel in consideration
GMAX, GMIN, m, MAXA, CUTOFF, and SCALE are arbitrary values depending on the desired viewing characteristics; in the preferred embodiment, suitable values are: GMAX=255, GMIN=−225, m=20, MAXA=25, CUTOFF=0.9919, and SCALE=1/200.

Turning again to FIG. 3, as a surface rendering is carried out by the processors, rectangular screen 68 is divided into small squares, called screen pixels. For a good resolution of three-dimensional views of the object, it is advantageous to consider a screen just large enough to contain a projection of the object. To achieve this goal, the diagonal of the box of interest is advantageously chosen to be the side dimension of the screen.

The magnification factor of the three-dimensional image is suitably achieved by choosing a screen of smaller size as a number of pixels subdividing the screen remains constant. For example, 256×256 pixels or 512×512 pixels is suitably chosen. The number of pixels of a screen will be referred to as the screen resolution. A change of three-dimensional views of the object is suitably realized by changing a position of the screen, rather than by rotation of an object itself. With continuing to FIG. 3, such a positioning of the viewing surface 68 is depicted in relation to the object 66. As noted above, the three-dimensional object is represented by a set of segments. In such a representation, a line segment belonging to the object represents a part thereof. In a case where all slices are parallel to one another, and when division of a slice into pixels is facilitated by rectangular grids as illustrated in FIG. 2(c), each segment represents a parallelepiped containing it. Dimensions of the parallelepiped 90 are as follows:
the length of the line segment 46 l;
the common side of pixels in an axial plane of the slice w; and
a distance between the slice containing the line segment and the following slice h.

For practical purposes, it is assumed that the union of all the parallelepipeds associated with the segments in the object representation is the three-dimensional object to be displayed. This assumption becomes more and more accurate as the distance between two consecutive slices is smaller and the number of pixels making up each slice gets larger.

It is further assumed that the sampling of the object in study is uniform, that is, the whole three-dimensional box of interest is subdivided into non-overlapping small parallelepipeds or voxels 74 (FIG. 3) of common size and shape. This assumption is satisfied in a case where all the slices are subdivided by small pixels of equal size, and a distance between two consecutive slices is constant throughout the entire three-dimensional box. The six faces of a voxel consist of two faces in the two slices sandwiching the voxel, and four other faces connecting the two pixels. With the proper choice of the coordinate system, it is suitably assumed that the faces of all of the voxels are perpendicular to an axis of the coordinate system.

Figure 4:
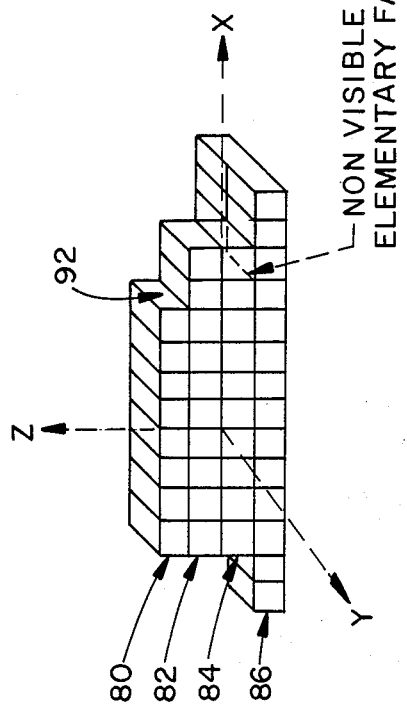
FIG. 4 illustrates a scheme for three-dimensional image data projection onto a viewing area.

With reference to FIG. 4, an elementary face of a voxel is defined as that in a subdivision of the three-dimensional box. In the Figure, segments from four slices 80, 82 84, and 86 are illustrated. Each elementary face is advantageously defined as a rectangle perpendicular to one of the axis of the coordinate system.

From an assumption that the object to be displayed is approximated by a union of the all the parallelepipeds associated with the line segment representing the object, it sufficient to consider only the elementary faces covering the parallelepipeds to construct a three-dimensional surface rendering of the object. In the Figure, concepts related to potentially visible elementary faces, non-visible elementary faces, and classification of potentially visible faces are illustrated. Two types of elementary faces are perpendicular to an axis of reference. One type consists of faces facing toward a positive direction of the axis and the other consists of faces oriented toward the negative. For example, a visible elementary face 92 is perpendicular to the y-axis. All together there are six types of elementary faces.

An elementary face is defined to be visible if it contains a visible point. For a given view, some elementary faces are visible, and some are not. An elementary face may be visible for one view, but may not be visible for another view.

To increase the speed in the formation of the three-dimensional perspective image of the object in the given direction to render the system adaptable for use in conjunction with a standard processor, most of the non-visible elementary faces are excluded from the list of faces to be processed. Criteria are seized upon to recognize non-visible faces for the exclusion process.

An elementary face is not visible if it is a common elementary face of two parallelepipeds belonging to the object. For a given view, there exists only three types of faces which may be visible. Elementary faces which are not excluded by these criteria are called potentially visible faces.

As elementary faces are classified into six different classes, at first those faces which are non-visible which satisfy at the first criteria at the same time are suitably eliminated.

In the example of FIG. 4, a second elimination criteria, will be noted. Only two elementary faces of a parallelepiped perpendicular to the x-axis are potentially visible. Both of them correspond to end points of a corresponding segment of the object representation, and both are listed in two different lists. It is assumed that within an image slice, line segments representing a three-dimensional object are parallel to the y-axis.

An elementary face perpendicular to the y-axis facing toward the positive direction is a potentially visible face if it is not an elementary face of a parallelepiped right in front of it. An elementary face perpendicular to the y-axis facing toward the negative direction is a potentially visible face if it is not an elementary face of a parallelepiped immediately behind it.

An elementary face perpendicular to the z-axis facing toward the positive direction is a potentially visible face if it is not an elementary face of a parallelepiped immediately on top of it. An elementary face perpendicular to the z-axis facing toward the negative direction is a potentially visible face if it is not an elementary face of a parallelepiped immediately below it.

If elementary faces oriented toward the positive direction are potentially visible, then elementary faces of the opposite direction are not, and vice versa.

Potentially visible elementary faces which are perpendicular to an axis are grouped into two different lists. One list consists of faces which are facing toward the positive direction of the axis, and the other consists of faces facing toward the negative direction. Consequently, the potentially elementary faces of the three-dimensional objects are classified and grouped in different lists.

For a given view, each elementary face is projected on a viewing area or screen as a parallelogram. Since the size of the elementary face is the same for all elementary faces of the same type, the size of their projections on the screen remains invariant. Each point of the parallelogram is assigned with its distance to the point of the element face along the viewing direction.

If more than two points from different elementary faces are projected to the same point on the screen, the projected point is assigned with the shortest distance.

Once all potentially visible faces are processed in the above manner, the shading of the image of the object on the screen can be done by assigning to each point on the screen as the following:
the point is a background point if there is no point of an elementary face projected on to it, the assigned gray level is a negative number, for instance minus one thousand;
otherwise, the point corresponds to a visible point of the surface of the object.

With regard to formula (1), above, the gray level assigned to the point is inversely proportional to the distance, of the corresponding visible point on the screen, and is proportional to a power of the cosine of the maximum of two numbers CUTOFF and AVERD. The number CUTOFF is fixed and is chosen once for all. The number AVERD is the sum of four other numbers, each number being obtained by taking the minimum between a number MAXA and the absolute value of the difference between the distances assigned to one of the four opposite pairs of pixels surrounding the pixel in consideration. In the subsequent implementation, the assigned gray level g is computed as a function of the assigned distance d by FORMULA (1) one above.

Figure 5:
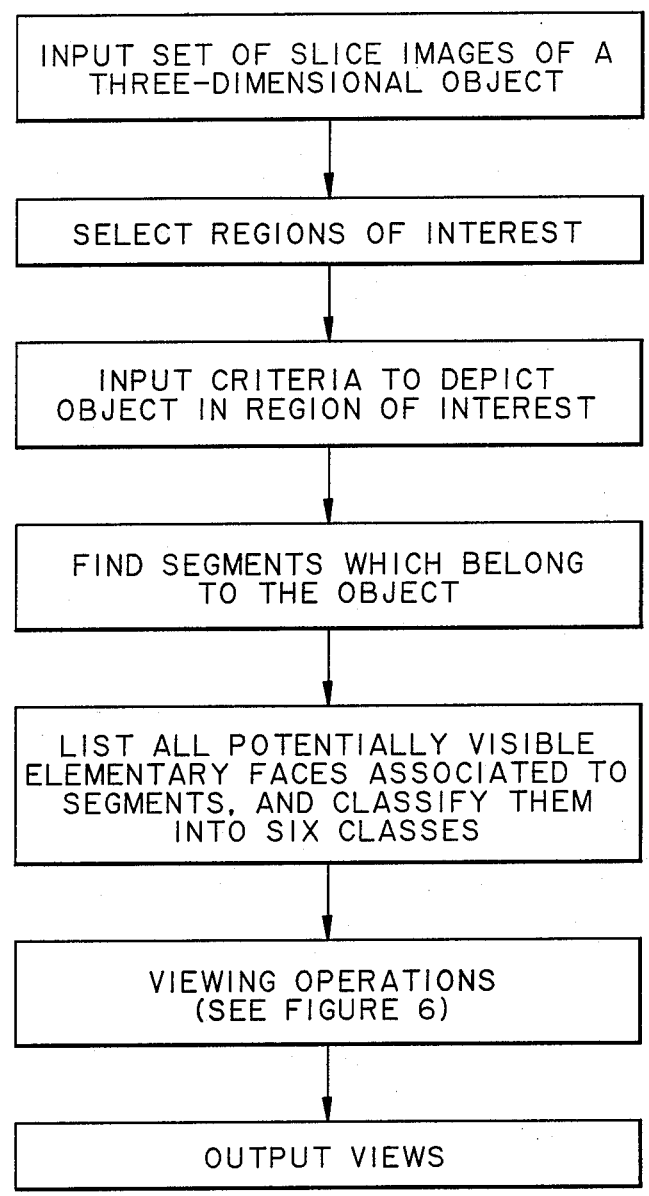
FIG. 5 is a flow chart for facilitating generation of the three-dimensional image of the present system.
Figure 6:
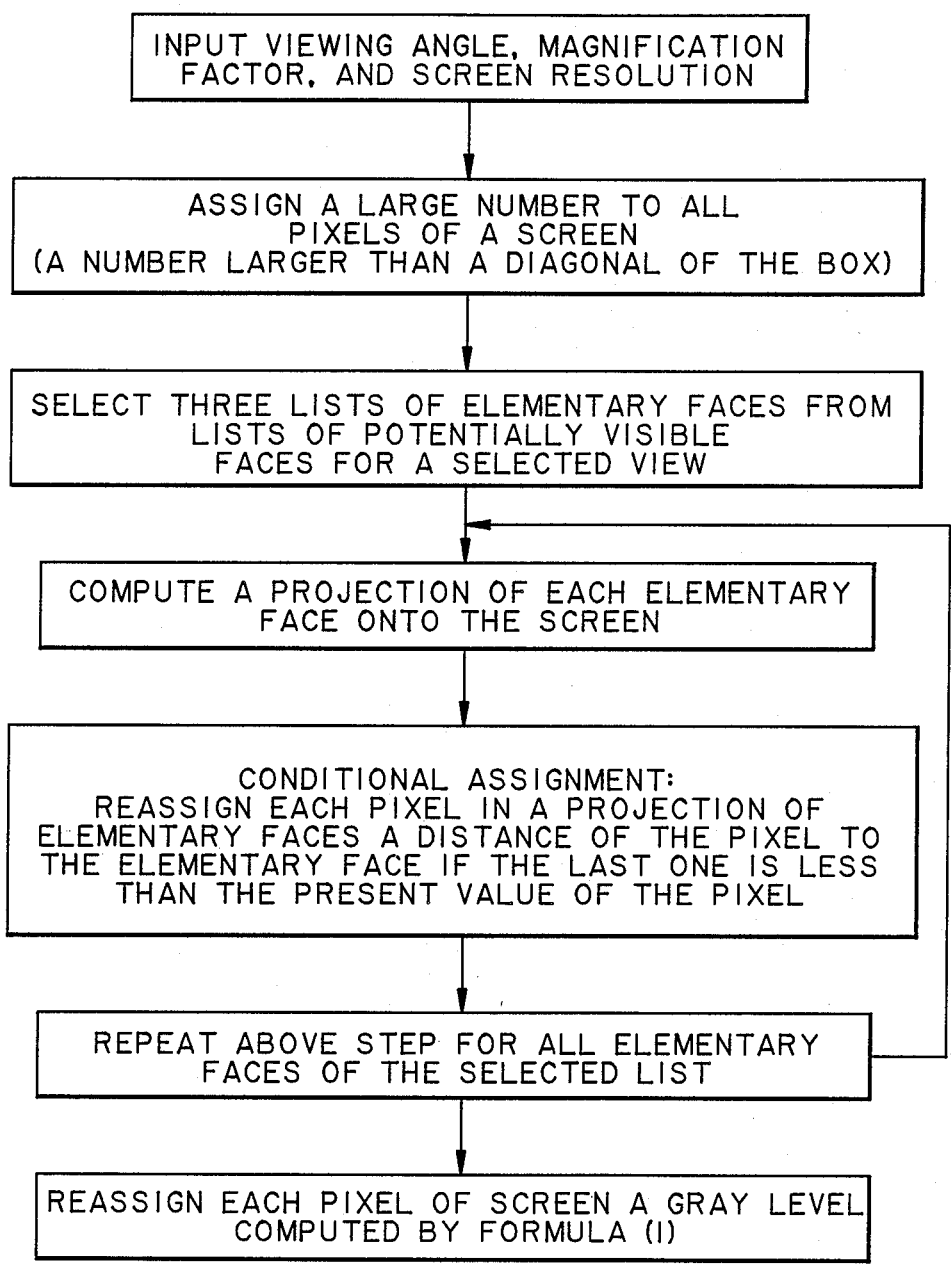
FIG. 6 is a flow chart of the viewing operations of the present three-dimensional viewing apparatus.

Turning to FIGS. 5 and 6, a diagram of the three-dimensional image generation process disclosed has been summarized in flow chart form.

Figure 7:
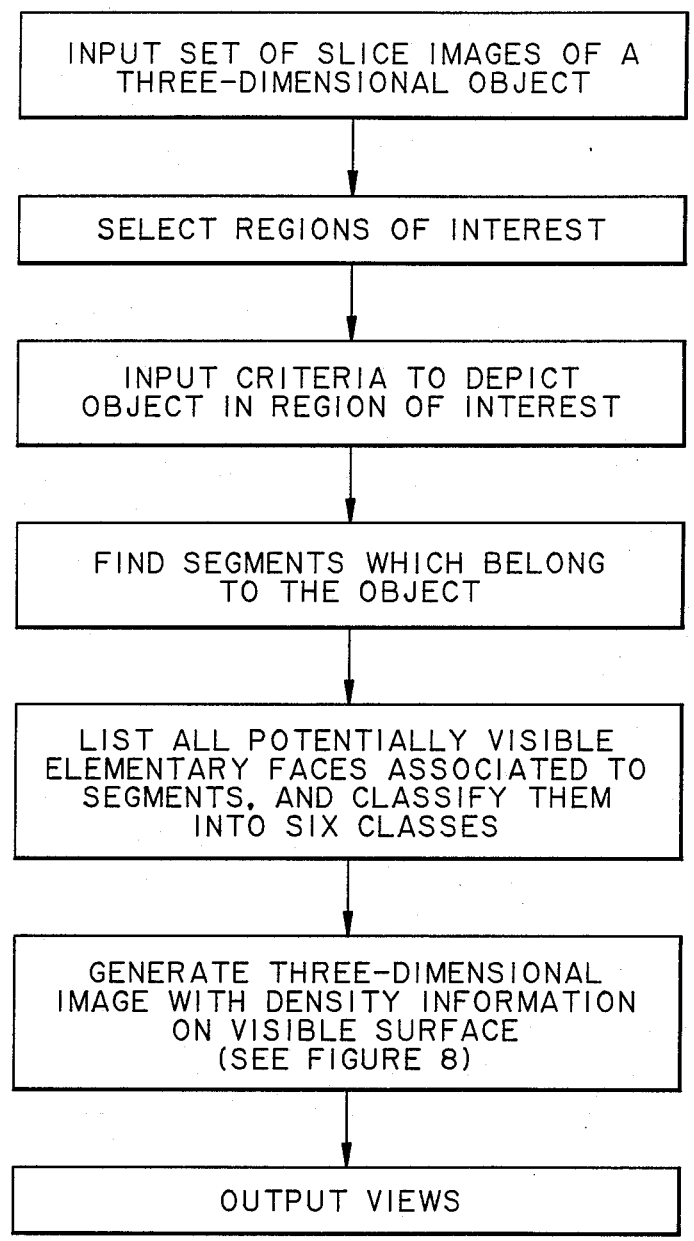
FIG. 7 is a flow chart illustrating an enhanced system for allowing surface density information to be displayed on a generated three-dimensional image.
Figure 8:
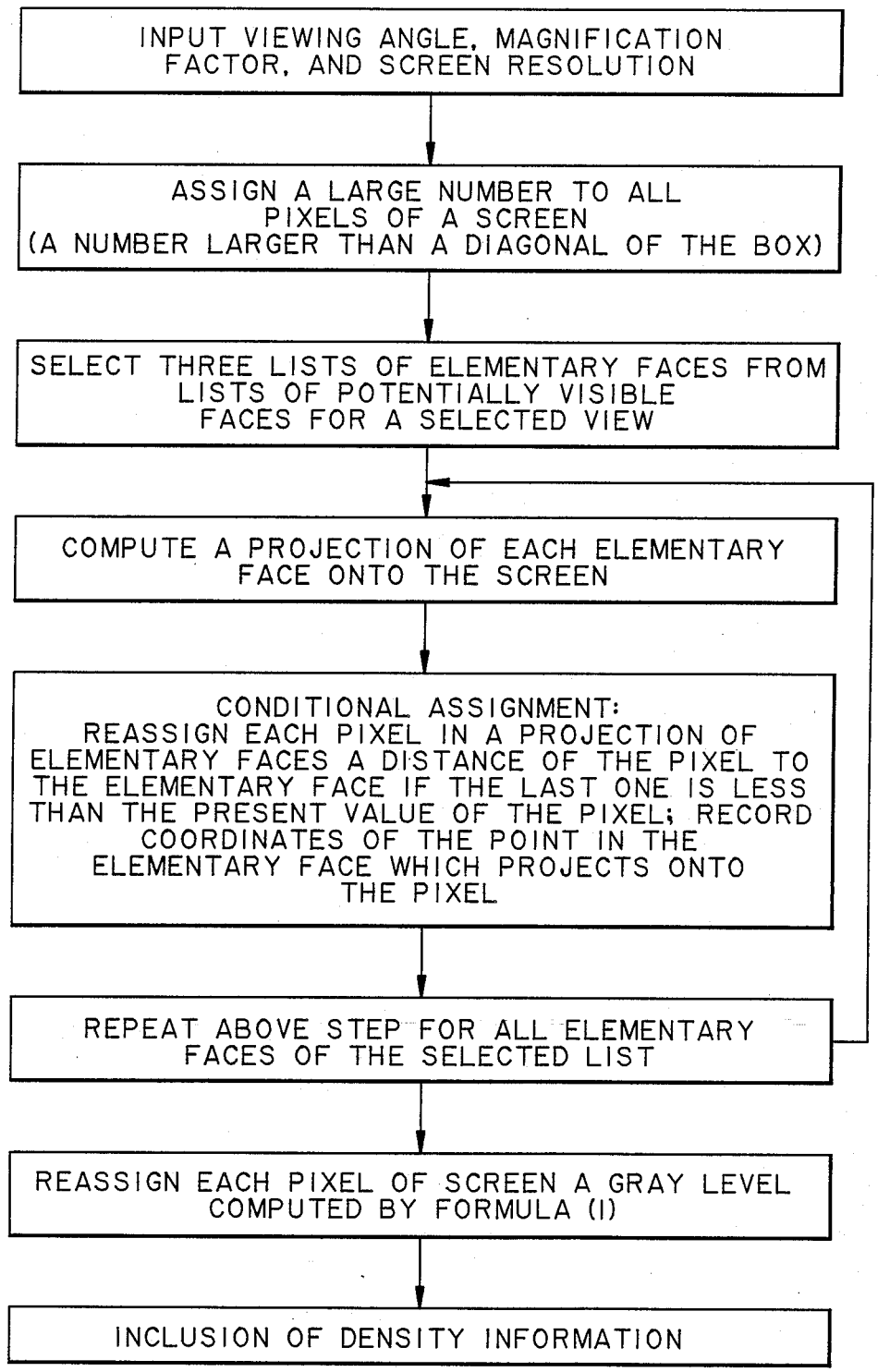
FIG. 8 is a continuation flow chart of FIG. 7.

The foregoing teaches a system for generating a three-dimensional image of a subject specimen. Although it gives a good representation of the specimen's dimensions, often times surface density properties would be advantageous in an analysis of the specimen. It will be recalled that the originally obtained slice data is obtained by such means as a CT scanner or an MRI scanner. If, for example, data were to have been obtained by a CT scanner, slice data is functionally related to an x-ray density of the specimen. Turning to FIGS. 7 and 8, a system is summarized for implementing this available data to obtain surface density representation on a three-dimensional image will be described in particularity below.

The following routine is adapted for generation of a three-dimensional image with surface density information encoded therein. It is, in the preferred embodiment, comprised of a software routine stored in memory 24.

The term "density" as used herein refers to, in the example of a CT scanner, the CT number or to $T_1$, $T_2$, IR, ... (weighted or non-weighted), in the case of MRI.

To create a three-dimensional image with density information from a series of axial slices, a series of tasks which are necessary for a formation of a three-dimensional image (with surface information only) must be executed. Moreover, coordinates of points on the surface of the object which are visible at the view in consideration must be recorded during the execution of those tasks. Coordinates of potential visible points in the above-described conditional assignment is recorded using 3 two-dimensional arrays of size equal to the size of the screen. For example, if, relative to a viewing screen, (n,n) is a location of a pixel in the projection of an elementary face, the coordinates of the potentially visible point are recorded in the appropriate array at the location (m,n). If the pixel (m,n) is reassigned with a new distance, the previously recorded coordinates are substituted by the coordinates of the corresponding new potentially visible point.

After a shaded three-dimensional image pertaining to the surface of a three-dimensional object is created, a new set of tasks must be performed in order to:

(1) extract density information from the slice data obtained from the object at the visible points, using coordinates which were recorded earlier during the three-dimensional view formation;

(2) perform necessary density interpolation of the density of appropriate pixels or subregions or interest from two different regions of interest;

(3) combine this computed density value with the gray level representing the surface of the object at the visible point;

(4) store the above product at the orthogonal projection of the visible point onto the screen on which the three-dimensional image is formed.

In a first step, in the 3 two-dimensional arrays of coordinates or visible points the coordinate representation is converted to a column number, a row number, and a region of interest ("ROI") number so that the density number can be retrieved from the original slice data of an appropriate ROI. An array containing the column number, row number, and ROI number of visible pixels is referred to as the X-array, the Y-array and the Z-array respectively. As the resolution of the third dimension of the original slice images is poor, in general, an interpolation across slices is needed. To economize computer storage, an interpolation code is stored in the Z-array. During such a conversion and storage, a total number, P of pixels within an ROI which are found in the X, Y, and Z-arrays is also stored for each ROI.

In a second step, another two-dimensional array is created with a size equal to that of the screen area. This array, which is used to create a final three-dimensional picture with density information, is called the three-dimensional image density screen. The image density screen containing the three-dimensional image formed without the presence of density information, as described earlier, is called the three-dimensional image surface screen.

In a third step, the three-dimensional image density screen is initialized to zero.

In a fourth step, an ROI with a non-zero total number P is read, and the following operations are performed thereon:

(a) a scan through the Z-array is made to ascertain pixels containing ROI numbers matching ROI numbers in consideration. For example, (m,n) may be assumed to be the location of such a pixel.

(b) a column number and row number from the X, and Y-arrays is retrieved at the location (m,n). (x,y) is assumed to be the column and row number respectively.

(c) density information d is read from slice data of the ROI at the location (x,y). Using d as the address, a number D is read through a look-up table which was established, once for all, at an early stage right after the listing of all potentially visible elementary faces. The same look-up table may function as the identity look-up table. In this case, if the value D and d are the same; a non-modified density value is obtained.

In some instances, however, non—modified density values do not afford good image quality, especially when the dynamic range of d is large and the three-dimensional object has a complex surface boundary. In such a situation, surface structure is lost in some portions of the image due to low dynamic range capability (0 to 255) out of the display monitor device. To circumvent this problem, a non—linear look-up table may be used. An example of such a look-up table is found in a case where it is subdivided into two parts. The lower part, which corresponds to soft tissue areas, serves as an identity look-up table. An upper part, which corresponds to bony areas, is a look-up table of slope, near zero, starting from the tail of the lower part look-up table.

(d) The number D is multiplied with a weight, w, between 0 and 1. This weight number is found through a look-up table using codes embedded in the Z-array at the location (m,n).

(e) The product w*D is added to the three-dimensional image density array at the location (m,n).

(f) The total number P is decremented by 1.

(g) Steps (a) through (g) are repeated until the number P becomes zero.

In step five, the operations of step four are repeated for all ROI's with a non-zero P.

In step 6, for all pixels which correspond to a visible point on the three-dimensional object, the three-dimensional density content is multiplied with their three-dimensional surface content, and the product is divided by the maximum value of the three-dimensional image surface array. Contents of remaining pixels is set to a negative number, such as minus 1000. This division is necessarily only when a surface array is not normalized, i.e. the shaded value is not in floating point format (a number between 0 and 1). These six steps form the INCLUSION OF DENSITY INFORMATION of FIG. 8.

The aforenoted procedures are summarized in flow chart form for implementation on the processor in FIGS. 7 and 8.

Figure 9:
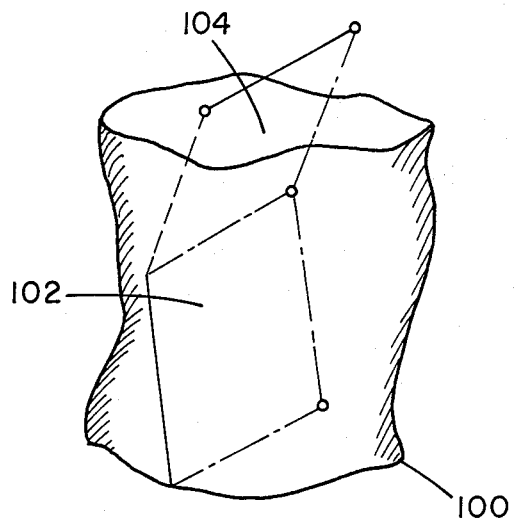
FIG. 9 illustrates a specimen image for cutting and viewing in accordance with the present invention.

With the foregoing, a system is provided for generating a three-dimensional image from a series of slice scans on a conventional processor means. The system further includes enablement for selective addition of surface density information on a generated three-dimensional object. Often times, it is also desirable to selectively view a selected portion of a three-dimensional object which has been created. For example, if a spinal image column were illustrated, a physician may desire to "split" the spine along one or more planes to facilitate viewing of an interior surface thereof. For example, turning to FIG. 9, a three-dimensional image of an object or specimen 100 represents a three-dimensional image. It my be desirous to cut the image 100 into one or more sections. Two sections are illustrated as cut along a surface such as that formed by planes 102, 104.

In the subject system, three means exist to define a cut surface for a three-dimensional image. In a first, two curves have a common vertex. The first curve is referred to as a primary curve and the second curve as a directional curve. In the second situation, one curve serves to cut the surface. In the third situation, two curves are used to define a cut surface, the curves in this instance, however, have no common vertex.

A curve for the foregoing is defined by a finite number of control points. Each point identified on the screen provides a point on the three-dimensional space of the three-dimensional object image. A curve is obtained by connecting two points of the three-dimensional space associated with two consecutive control points.

Figure 10:
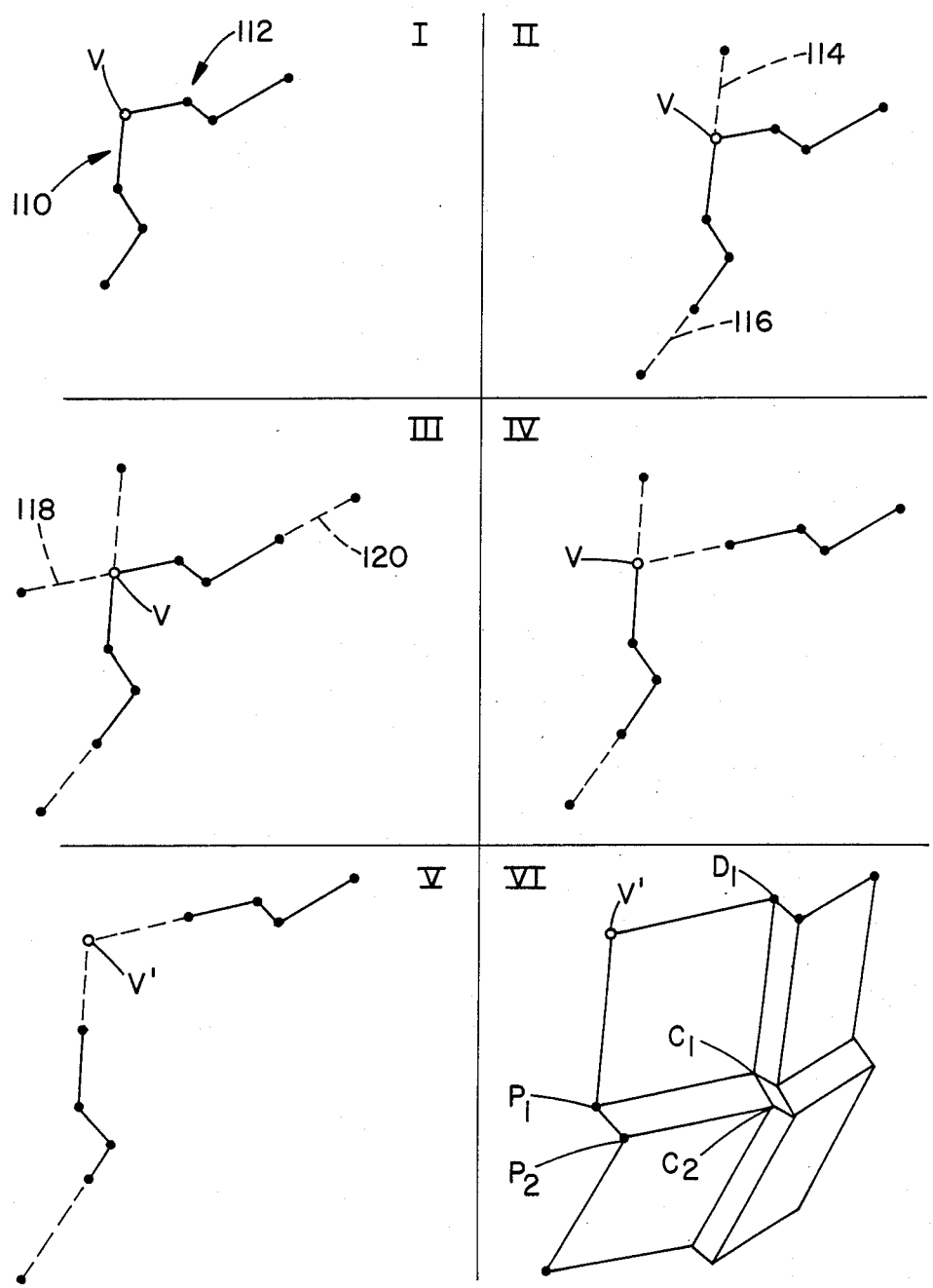
FIG. 10 illustrates a procedure for cutting an image in the system of the present invention.
Figure 11:
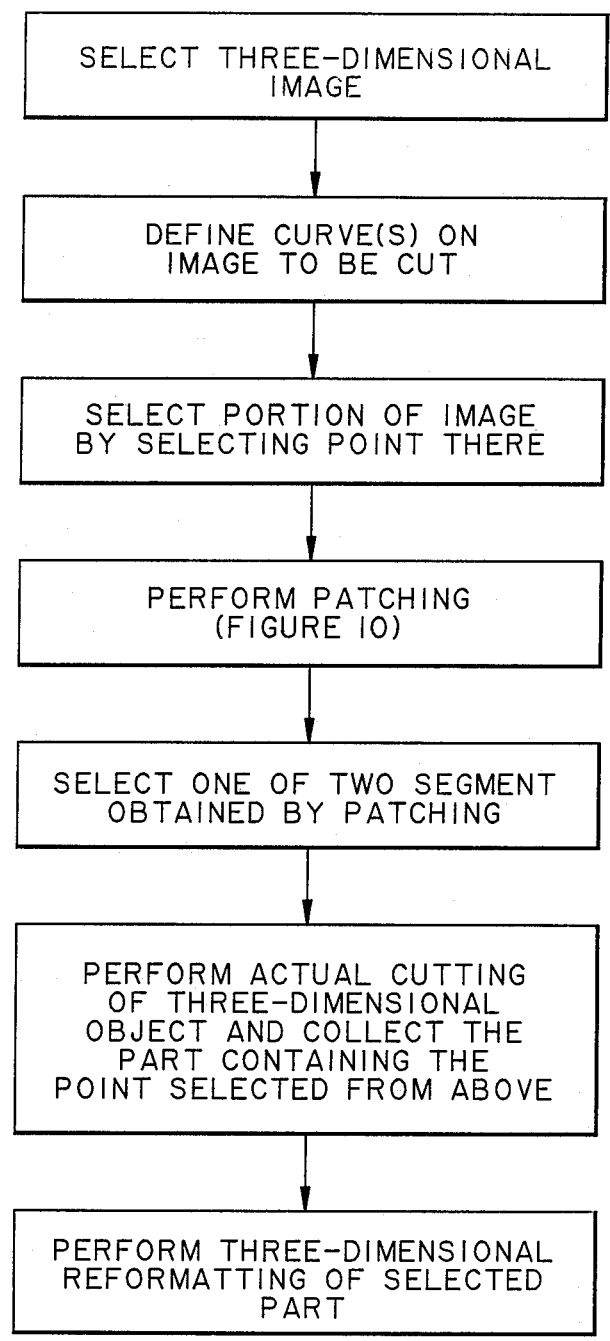
FIG. 11 is a flow chart of the image slices operation of the present invention.

The first case, noted above, is the most difficult to visualize, and will be described in conjunction with FIG. 10. In this case, a primary curve and a secondary curve share a common vertex. The cut surface is obtained as illustrated in the FIG. 10.

In block I, the primary curve is illustrated at 110 and the directional curve at 112. These curves meet at a common vertex point v.

In block II, both ends of the primary curve are extended until they exceed the three-dimensional BOI. The vector 114 joining the common vertex v and the endpoint of a backward extension of the primary curve is called its backward extension vector.

In block III, both ends of the directional curve are extended until they exceed the three-dimensional box. The 118 starting from the common vertex is called a backward extension. The vector 118 joining the common vertex and the endpoint of the backward extension of the directional curve is called its backward extension vector. Extensions 116 and 120 are extensions necessary to exceed the BOI.

In block IV, the primary curve is translated with a vector of translation equal to backward extension vector of the directional curve.

In block V, the directional curve is translated with the vector of translation equal to the backward extension vector of the primary curve. (It will be noted that after completion of the foregoing two steps, the translated curves are caused to again have one common end point called the new common vertex v'.)

In block VI, a cut surface is generated by a method of parallelogram completion, starting from the new common vertex v' of the extended primary and directional curves. Starting from three non-linear points such as the common vertex v', a point P, (on the translated primary curve) next to v' and a point D, (on the translated directional curve) create another point C, which is the fourth vertex of the parallelogram $P_1$, v', $D_1$, C. The next parallelogram completion, starting from the three points $P_2$, $P_1$, $C_1$, create a point $C_2$. And subsequent parallelograms are completed in a like manner. The parallelogram completion is done along the primary curve till the last parallelogram is out of the three-dimensional box.

In the second situation, case two above, that being wherein only one curve is used to bisect the three-dimensional object, the same general steps are followed except that the directional curve is assumed to be in a line perpendicular to the screen.

Figure 12:
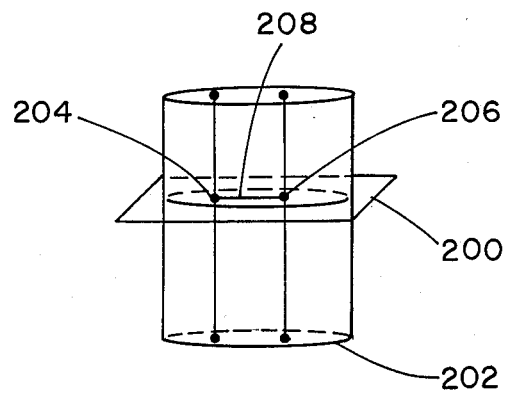
FIG. 12 illustrates an alternate cutting operation of that described in FIG. 11.

Turning to FIG. 12, the third situation, case three above is illustrated. In this case, two curves are implemented having no common vertex. The cut surface is generated as follows.

First, a curve 200 is isolated which corresponds to a curve drawn on the three-dimensional image 202.

Secondly, as there is at most one intersection point between any region of interest with the three-dimensional curve, there are at most two points of intersection between any region of interest with the two curves. See, e.g. points 204 and 206.

Thirdly, on a region of interest with two points of intersection, points are connected with a line 208. This line is considered to be a line of intersection of a cut surface with a region of interest.

Fourthly, on a region of interest with one point of intersection, the line of intersection of the cut surface is assumed to be the line passing through the point and parallel to the line of intersection of the cut surface with the above slice. If there is no above slice, direction is assumed to be normal to the screen.

Fifthly, on a region of interest with no point of intersection, the line of intersection of the cut surface with a region of interest is assumed to be the orthogonal projection onto the region of interest of a line of intersection of the cut surface with the previous region of interest. If this region of interest is the first region of interest, the line of intersection is assumed to be outside the of the region of interest.

Lastly, the lines of intersection of the cut surface with all the regions of interest of the three-dimensional box are used to do the cutting of the actual three-dimensional object. Cutting can be performed from the lines of intersection since the object is defined only with the slices.

The three cases allow for cutting of a three-dimensional object image easily and efficiently along any plane or planes of interest. This provides an aid to physicians and technicians in an examination procedure.

The flow of the aforenoted cutting is as follows:

1. Select a three-dimensional image;
2. Draw 1 or 2 curves on the three-dimensional image to define a cut surface;
3. Select the portion to do three-dimensional image by selecting a point on the three-dimensional image;
4. Perform the patching of the cut surface based on the curves previously drawn on the screen;
5. The patch surface divides the box of interest (or three-dimensional box) into two parts. Identify the part containing the point selected in step 3;
6. Perform the actual cutting of the three-dimensional object and collect the part containing the point selected in step 3; and
7. Do the three-dimensional image reformatting of the collected part.

The invention has been described with reference to the preferred embodiment. Obviously modifications and alterations will occur to others upon the reading and understanding of this specification. It is intended that all such modifications and alterations be included insofar as they come within the scope of the appended claims or the equivalents thereof.

Having thus described the invention, it is now claimed:

1. A diagnostic imaging apparatus for forming a three-dimensional representation of a specimen comprising:
   acquisition means for acquiring slice data indicative of a physical property of a plurality of generally planar regions of a specimen, each generally planar region being divided into a plurality of subregions represented by subregion data representative of that portion of the slice data unique thereto;
   means for assigning a viewing value to subregions of at least one of the planar slices, the viewing value being assigned in accordance with subregion data thereof;
   means for segregating at least a first one of the subregions to define a region of interest;
   means for defining a boundary of interest within the region of interest;
   means for assembling image data representative of subregions of the boundary of interest as a function of subregion data unique thereto;
   scaling means for assigning a scaled value to at least a portion of the image data, such that the image data is representative of first, second, and third dimensions of an associated specimen; and
   means for projecting the image data onto a viewing surface.

2. The diagnostic imaging apparatus of claim 1 wherein the scaling means includes means for adjusting the scaled value in accordance with a virtual displacement of the image data from the viewing surface.

3. The diagnostic imaging apparatus of claim 2 wherein the scaling means further includes means for adjusting a plurality of the scaled values in accordance with an angle of a normal to the boundary of interest in relation to the viewing surface.

4. The diagnostic imaging apparatus of claim 1 further comprising means for extrapolating the region of interest to at least a second generally planar region to form at least one extrapolated region of interest.

5. The diagnostic imaging apparatus of claim 4 further comprising means for extrapolating the boundary of interest into at least the one extrapolated region of interest.

6. The diagnostic imaging apparatus of claim 4 further comprising means for varying a position of the viewing surface in relation to the image data.

7. The diagnostic imaging apparatus of claim 6 wherein the acquisition means is comprised of at least one of a magnetic resonance device and a computed tomographic device.

8. The diagnostic imaging apparatus of claim 1 further comprising means for extrapolating the boundary of interest to at least a second region of interest.

9. A method of forming a three-dimensional representation of a specimen comprising the steps of:
   acquiring slice data indicative of a physical property of a plurality of generally planar regions of a specimen, each generally planar region being divided into a plurality of subregions represented by subregion data;
   assigning a viewing value to subregions of at least one of the plurality of generally planar slices, the viewing value being assigned in accordance with subregion data thereof;
   segregating at least a first one of the generally planar regions to form a region of interest;
   extrapolating the region of interest to at least a second generally planar region to form at least one extrapolated region of interest;
   defining a boundary around a portion of the region of interest;
   assembling image data representative of subregions within the boundary of interest as a function of subregion data unique thereto;
   assigning a scaled value representative of at least a portion of the image data, whereby image data representative of a first, second, and third dimensions of the object is assigned; and
   projecting the image data onto a viewing surface.

10. The method of claim 9 further comprising the steps of determining a displacement of image data from the viewing surface and adjusting the scaled value in accordance therewith.

11. The method of claim 10 further comprising the steps of determining an angle of a normal to the boundary of interest to the viewing surface and adjusting a plurality of the scaled values in accordance therewith.

12. The method of claim 11 further comprising the step of extrapolating the boundary of interest to at least the one extrapolated region of interest.

13. The method of claim 12 further comprising the step of varying a position of the viewing surface in relation to the image data.

14. A diagnostic imaging apparatus for forming a three-dimensional representation of a specimen comprising:
   acquisition means for acquiring slice data indicative of a physical property of a plurality of generally planar regions of a specimen, each generally planar region being divided into a plurality of subregions represented by subregion data representative of that portion of the slice data unique thereto;
   means for assigning a viewing value to generally all subregions of at least one of the plurality of generally planar slices, the viewing value being assigned in accordance with subregion data thereof;
   means for selectively defining a section of at least a first one of the generally planar regions to form a region of interest;
   means for defining a boundary of interest within the region of interest;

means for projecting the boundary region into other subregions;

scaling means for assigning a scaled value representative of at least a portion of the image data, whereby image data representative of first, second, and third dimensions of the object is assigned;

means for projecting the image data onto a viewing surface;

means for adjusting the scaled value in accordance with a virtual displacement of the image data from the viewing surface;

means for adjusting a plurality of the scaled values in accordance with an angle of a tangent to the boundary of interest in relation to the viewing surface; and means for extrapolating the region of interest to at least a second generally planar region to form at least one extrapolated region of interest.

15. The diagnostic imaging apparatus of claim 14 further comprising means for extrapolating the boundary of interest into at least the extrapolated region of interest.

16. The diagnostic imaging apparatus of claim 15 further comprising means for varying a position of the viewing surface in relation to the image data.

17. The diagnostic imaging apparatus of claim 16 wherein the acquisition means is comprised of at least one of a magnetic resonance device and a computed tomographic device.

18. A diagnostic imaging apparatus for forming a three-dimensional representation of a specimen comprising:

acquisition means for acquiring spatially encoded slice data indicative of a physical property of a plurality of generally planar regions of a specimen, each generally planar region being divided into a plurality of subregions represented by spatially encoded subregion data representative of that portion of the slice data unique thereto;

means for assigning a viewing value to generally each subregion of each of the plurality of generally planar slices, an assigned viewing value being functionally related to subregion data;

partitioning means including:
 means for apportioning first one of the generally planar regions to form a first region of interest, and
 means for apportioning at least a second of the generally planar regions to form at least second region of interest;

boundary means including:
 means for defining a first boundary of interest within the first region of interest, and
 means for defining a boundary of interest within at least the second region of interest;

means for defining a position of an associated viewing surface in relation to generally each viewing value;

scaling means for a scaling generally each viewing value in accordance with a displacement thereof from the associated viewing surface;

means for modifying generally each viewing value in accordance with subregion data from which it was derived; and means for projecting the image data onto a viewing surface.

19. The diagnostic imaging apparatus of claim 18 wherein said boundary comprises a plurality of generally parallel, linearly adjacent, subregions.

20. The diagnostic imaging apparatus of claim 19 further comprising means for determining potentially visible face portions of each of the data segments, a visible face portion being defined as that portion of a data segment which is directly projectable on the viewing surface without obstruction by another of the data segments.

21. The diagnostic imaging apparatus of claim 20 wherein the partitioning means includes means for apportioning the second region of interest as an extrapolation of a partitioning from the first partitioning means.

22. The diagnostic imaging apparatus of claim 21 wherein the boundary means includes means for defining the second boundary of interest as an extrapolation of the first boundary of interest.

23. The diagnostic imaging apparatus of claim 22 wherein the scaling means further includes means for adjusting a plurality of the scaled values in accordance with an angle of a tangent to the boundary of interest in relation to the viewing surface.

24. The diagnostic imaging apparatus of claim 23 further comprising means for varying a position of the viewing surface in relation to the image data.

25. The diagnostic imaging apparatus of claim 24 wherein the acquisition means is comprised of at least one of a magnetic resonance device and a computed tomographic device.

26. A method of forming a three-dimensional representation of a specimen comprising the steps of:

(a) acquiring spatially encoded slice data indicative of a physical property of a plurality of generally planar regions of a specimen, each generally planar region being divided into a plurality of subregions represented by spatially encoded subregion data representative of that portion of the slice data unique thereto;

(b) assigning a viewing value to generally each subregion of each of the plurality of generally planar slices, an assigned viewing value being functionally related to subregion data;

(c) segregating a first one of the generally planar regions to form a first region of interest;

(d) segregating at least a second of the generally planar regions to form at least second region of interest;

(e) defining a first boundary of interest within the first region of interest;

(f) defining a second boundary of interest within at least the second region of interest;

(g) defining a position of an associated viewing surface in relation to generally each viewing value;

(h) scaling each viewing value generally in accordance with a displacement thereof from the associated viewing surface; and (i) projecting the image data onto a viewing surface.

27. The method of claim 26 wherein at least one of steps (e) and (f) includes the step of defining each boundary of interest as a plurality of generally parallel, linear, data segments.

28. The method claim 27 further comprising the step of determining potentially visible face portions of each of the data segments, a visible face portion being defined as that portion of a data segment which is directly projectable on the viewing surface without crossing another of the data segments, prior to commencement of step (i).

29. The method of claim 28 wherein step (d) includes the step of apportioning the second region of interest as an extrapolation of a partitioning from step (c).

30. The method of claim 29 wherein step (e) includes the step of defining the second boundary of interest as an extrapolation of the first boundary of interest defined in step (d).

31. The method of claim 30 wherein step (h) includes the step of adjusting a plurality of the scaled values in accordance with an angle of a tangent to the boundary of interest in relation to the viewing surface.

32. The method of claim 31 further comprising the step of varying a position of the viewing surface in relation to the image data prior to the commencement of step (i).

33. A diagnostic imaging apparatus for forming a three-dimensional representation of a specimen comprising:
   acquiring means for acquiring image data representative of a three-dimensional image of a specimen;
   monitor means having a viewing area;
   means for projecting the image data to the viewing area;
   means for defining a cutting surface;
   means for projecting the cutting surface on the viewing area;
   means for dividing the image data to at least a first portion and a second portion in accordance with the cutting surface;
   means for generating modified image data representative of divided image data; and
   means for projecting the modified image data to the viewing surface.

34. The diagnostic imaging apparatus of claim 33 further comprising means for selecting one of the portions and wherein the modified image data is comprised of the selected portion.

35. The diagnostic imaging apparatus of claim 34 further comprising means for varying a position of the viewing surface in accordance with the modified image data.

36. The diagnostic imaging apparatus of claim 35 further comprising a scaling means for assigning a scaled value to subregions of the image data, whereby image data representative of a first, second, and third dimension is assigned.

37. The diagnostic imaging apparatus of claim 36 wherein the scaling means further includes means for adjusting the scaled value in accordance with a perceived displacement of the image data from the viewing surface.

38. The diagnostic imaging apparatus of claim 37 wherein the scaling means further includes means for adjusting a plurality of the scaled values in accordance with an angle of a normal to the boundary of interest in relation to the viewing surface.

39. The diagnostic imaging apparatus of claim 38 further comprising means for deriving the three dimensional image data from a plurality generally parallel, two dimensional images.

40. The diagnostic imaging apparatus of claim 39 wherein the means for deriving the three dimensional image data is comprised of at least one of a computed tomography scanner and a magnetic resonance imaging device.

41. The diagnostic imaging apparatus of claim 36 further comprising the step of adjusting the scaled value in accordance with a perceived displacement of the image data from the viewing surface.

42. The method of claim 41 further comprising the step of adjusting a plurality of the scaled values in accordance with an angle of a normal to the boundary of interest in relation to the viewing surface.

43. The method of claim 42 further comprising the step of deriving the three dimensional image data from a plurality generally parallel, two dimensional images.

44. A method of diagnostic imaging comprising the steps of:
   acquiring image data representative of a three dimensional image of a specimen;
   projecting the image data to an associated viewing area;
   defining a cutting surface;
   projecting the cutting surface on the associated viewing area;
   dividing the image data to at least a first portion and a second portion in accordance with the cutting surface;
   generating modified image data representative of divided image data; and
   projecting the modified image data to the associated viewing surface.

45. The method of claim 44 further comprising the step of selecting one of the portions and wherein the step of generating modified is directed to image data comprising the selected portion.

46. The method of claim 45 further comprising the step of varying a position of the viewing surface in accordance with the modified image data.

47. The method of claim 46 further comprising the step of assigning a scaled value to subregions of the image data, whereby image data representative of a first, second, and third dimension is assigned.

48. A method of forming a three dimensional representation of a specimen comprising the steps of:
   acquiring a plurality of parallel planar slices, each slice being comprised of spatially encoded data representative of a physical property along a plane of a specimen;
   assigning a gray scale value corresponding to spatially encoded data of one slice;
   generating a two-dimensional image of the one slice on a video display terminal;
   isolating a region of interest encompassing a selected portion of the one slice in accordance with the image;
   extrapolating the region of interest to other slices to form a box of interest;
   assigning a virtual screen location in relation to the box of interest;
   selectively projecting spatially encoded data within the box of interest to the virtual screen location; and
   generating an image from projected spatially encoded data.

* * * * *